Aug. 24, 1926.
F. A. HAUGHTON
1,597,463
METHOD OF AND MEANS FOR FASTENING TOGETHER METALLIC PARTS
Filed Feb. 19, 1925
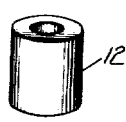
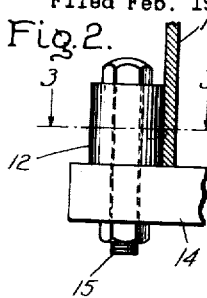
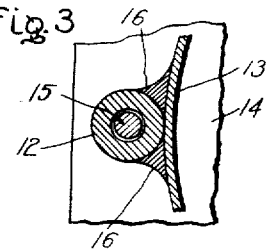
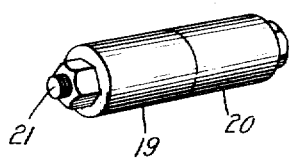
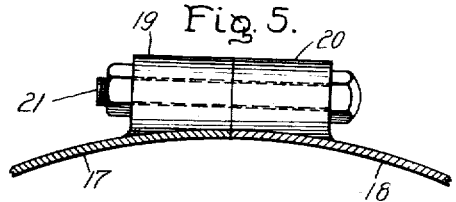
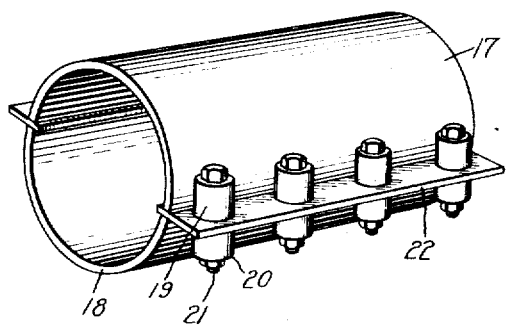
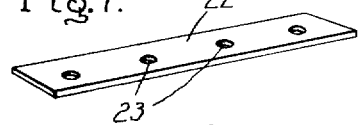
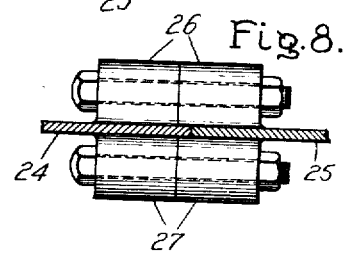
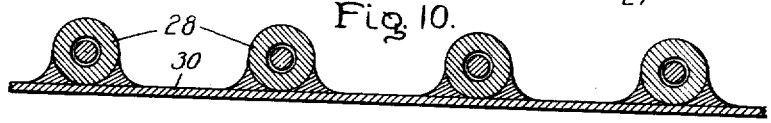
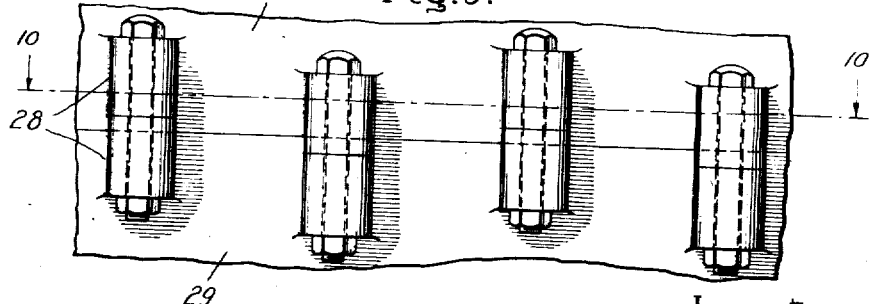
Inventor
Frank A. Haughton
by
His Attorney Patented Aug. 24, 1926.

1,597,463

UNITED STATES PATENT OFFICE.

FRANK A. HAUGHTON, OF SCHENECTADY, NEW YORK, ASSIGNOR TO GENERAL ELECTRIC COMPANY, A CORPORATION OF NEW YORK.

METHOD OF AND MEANS FOR FASTENING TOGETHER METALLIC PARTS.

Application filed February 19, 1925. Serial No. 10,384.

The present invention relates to the fastening together of metallic parts and especially to the fastening together of metallic parts by means of bolts and lugs.

The object of my invention is to provide an improved method of and means for fastening together metallic parts wherein such parts may be quickly and accurately detachably fastened together at a low cost, and with a minimum amount of labor, and for a consideration of what I believe to be novel and my invention, attention is directed to the accompanying description and the claims appended thereto.

In the drawing, Fig. 1 is a perspective view of a part which is used in carrying out my invention; Fig. 2 is a side view showing a structure embodying my invention partially completed; Fig. 3 is a sectional view taken on line 3—3, Fig. 2, but showing a completed structure; Fig. 4 is a perspective view of certain parts used in carrying out my invention in modified form; Fig. 5 is a detail view illustrating further the modification of Fig. 4; Fig. 6 is a perspective view of a further modification of my invention; Fig. 7 is a perspective view of a part used when carrying out my invention in accordance with the modification shown in Fig. 6; Fig. 8 is a view of another embodiment of my invention; Fig. 9 is a side view of a still further modification, and Fig. 10 is a sectional view taken on line 10—10, Fig. 9.

In carrying out my invention in accordance with the modification shown in Figs. 1, 2 and 3, which illustrate the invention in one of its simplest forms, I provide a tubular member 12 having thick walls and an opening through its center of a diameter such as to receive a desired size of fastening bolt. Tubular member 12 may be a short section of thick pipe with its ends suitably finished so they will be perfectly true. In Figs. 2 and 3, 13 and 14 indicate two metallic parts to be fastened together, it being desired to provide a bolting lug on the part 13 by means of which it is to be bolted to the part 14.

The tubular member 12 is utilized as a bolting lug, and according to my invention I first bolt it to the part 14 by means of a suitable bolt 15, the nut on the bolt being screwed up tight so that the tubular member 12 will be firmly attached to the part 14. Following this I then permanently attach the tubular member 12 to the part 13 by means of fusion of metal such as by welding, soldering, brazing or the like, it being understood that by the term fusion of metal I mean any suitable or known means for permanently attaching together two metallic parts by means of metallic material which is first fused and then permitted to harden in effecting the attachment of one part to the other. In Fig. 3, 16 indicates the metal by means of which the tubular member 12 is permanently attached to the metal part 13, the fastening being indicated as having been performed by welding.

Tubular member 12 thus forms an integral portion of metallic part 13 and becomes in substance a bolting lug for it. Now, when it is desired to separate the two parts, the bolt 15 may be removed whereby the part 13 may be lifted away from the part 14. However, it will be noted that the bolting lug 12 has become a permanent portion of the part 13 and then when it is desired to attach parts 13 and 14 together again it is only necessary to place the one on the other and again fasten them by means of the bolt.

By the above-described arrangement it will be seen that there is provided a bolting lug on the one part 13 which may be provided at a low cost and which when permanently attached to the part 13 in accordance with my method is accurately positioned relatively to the part 14 to which it is to be bolted. All that is required is that prior to permanently fastening the lug 12 to part 13, the parts 13 and 14 be correctly positioned relatively to each other.

Tubular members 12 can be provided at a low cost by cutting them from pipe having a suitable wall thickness.

By bolting the tubular member 12 in position on part 14 by means of bolt 15 prior to permanently attaching it to the part 13 the tubular member 12, which is to become a bolting lug, is accurately positioned relatively to the hole in part 14 so that when permanently attached to the part 13 there is no likelihood that the parts will not be positioned correctly relatively to each other. And in addition, when the parts are unbolted, it is insured that they can be bolted together again and that the lug will be positioned correctly with relation to the bolt hole.

In Figs. 4 and 5 is illustrated an embodiment of the invention wherein two parts 17 and 18 are to be fastened together and wherein it is desired or is necessary to provide a bolting lug on each part. In this case, I provide two tubular members 19 and 20 which are to form the lugs, and I first fasten them together by a bolt 21 which may be the bolt to be finally used with the lugs. This is shown in Fig. 4. I then place the two members 19 and 20 while bolted together in correct position relatively to parts 17 and 18 and permanently attach them thereto, one member being attached to part 17 and the other to part 18. The members 19 and 20 thus become bolting lugs permanently attached to parts 17 and 18 and connected together by bolt 21.

By fastening the members 19 and 20 together by bolt 21 prior to attaching them to parts 17 and 18, it is assumed that the two members will be positioned correctly relatively to each other after they are permanently fastened to parts 17 and 18 and that the holes in them will be aligned correctly. As before, the members 19 and 20 can be provided at a low cost in that they can be cut from suitable pipes, it being only necessary that their ends, and particularly their abutting ends, be correctly finished.

A number of lugs or pairs of lugs may be provided for fastening together two metallic parts such as parts 17 and 18, and if it is desired that these lugs be spaced accurately so as to render the parts, such as the parts 17 and 18, interchangeable I may provide a templet in the form of a plate 22 having holes 23 therein spaced apart a distance equal to that desired for the bolting lugs. The tubular members 19 and 20 may be then first bolted to this plate by means of the bolts 21 as is shown in Fig. 6, after which the members 19 and 20 may be permanently attached to the parts 17 and 18. The plate 22 may extend between the edges of parts 17 and 18, in which case the adjacent ends of the lugs will be flush with the edges of the parts, or it may not extend between such edges in which case the adjacent ends of the lugs will be spaced back somewhat from the edges of the parts. In the latter case, the edges of the parts can be tightly pulled together by the bolts.

When thin-edged parts, such as the parts shown at 24 and 25 in Fig. 8, are to be provided with bolting lugs and fastened together, and it is desired that the edges be maintained accurately in engagement with each other, I may provide bolting lugs on each side of the parts and in addition arrange the plane of abutment between the lugs out of line with the plane of abutment between the edges of the parts. This is shown in Fig. 8 wherein a pair of bolting lugs 26 and 27 are located on opposite sides of parts 24 and 25 and wherein the plane of the meeting edges of parts 24 and 25 is out of line with the plane of abutment between the pairs of lugs. The meeting edges of parts 24 and 25 are thus held accurately in engagement with each other by reason of the fact that the edge of part 24 projects between the lugs on the adjacent part 25.

In some instances it may not be desirable or convenient to provide bolting lugs on both sides of the parts to be bolted together, and in such case I may utilize the arrangement shown in Figs. 9 and 10 wherein successive pairs of bolting lugs 28 are arranged with their abutting edges on opposite sides of the abutting edges of parts 29 and 30 which are being bolted together. This serves to hold the meeting edges of parts 29 and 30 in engagement with each other by reason of the fact that the lug on first one part and then the other overlaps such meeting edges.

The constructions shown in Figs. 8, 9 and 10 wherein the lugs themselves serve to hold in alignment the edges of the parts bolted together have the advantage that a good fit of the bolts in the holes in the lugs is not necessary. As a result the holes in the lugs may be made oversize and ordinary unfinished commercial bolts such as machine bolts used for bolting the part stogether. Such bolts, not being finished, vary somewhat in size, and the holes in the lugs will be made of a size to take care of the variations met with. As a result both the lugs and the bolts may be provided at a low cost.

It will be seen that by my invention I am enabled to provide parts to be bolted together with accurately positioned and accurately aligned bolting lugs, and furthermore, that by my invention it becomes a simple matter to provide any parts with such lugs. Tubular members for forming bolting lugs may be provided in standardized or stock sizes and in addition may be provided assembled ready for use as shown in Fig. 2 when this particular arrangement is to be used.

What I claim as new and desire to secure by Letters Patent of the United States, is:—

1. The method of attaching together two metallic parts which comprises first detachably fastening a lug to one of said parts, and then while held on said one part permanently fastening it to the other of said parts.

2. The method of attaching together two metallic parts which comprises first detachably fastening a lug to one of said parts, and then while held on said one part permanently fastening to the other of said parts by fusion of metal.

3. The method of attaching together two metallic parts which comprises taking a tubular member, bolting it to one of said parts, and then permanently attaching it to the other of said parts by fusion of metal.

4. The method of attaching together two metallic parts by means of a lug and a bolt which comprises first bolting the lug to one of said parts and then attaching it to the other of said parts by fusion of metal.

5. The method of detchably fastening together two metallic parts by means of lugs and bolts, which comprises first bolting the lugs together to hold them in the desired relation to each other and then attaching the lugs to the parts by fusion of metal.

6. The method of attaching together two metallic parts by means of lugs and bolts, which comprises first assembling the lugs and bolts on a templet in the desired relation to each other, and then permanently uniting the lugs to said parts.

7. The method of attaching together two metallic parts by means of lugs and bolts, which comprises first assembling the lugs and bolts together, and then permanently uniting the lugs to said parts with the joints between the lugs out of alignment with the joint between the two parts.

8. The method of attaching together two metallic parts by means of lugs and bolts, which comprises first assembling the lugs and bolts together, and then permanently uniting the lugs to said parts with the joints between the lugs staggered relatively to the joint between the two parts.

9. The combination with two thin-edged parts to be bolted together, of a series of pairs of bolting lugs attached to said parts by fusion of metal with the joints between pairs out of alignment with the joint between said parts.

In witness whereof, I have hereunto set my hand this 18th day of February, 1925.

FRANK A. HAUGHTON.

and then permanently attaching it to the other of said parts by fusion of metal.

4. The method of attaching together two metallic parts by means of a lug and a bolt which comprises first bolting the lug to one of said parts and then attaching it to the other of said parts by fusion of metal.

5. The method of detchably fastening together two metallic parts by means of lugs and bolts, which comprises first bolting the lugs together to hold them in the desired relation to each other and then attaching the lugs to the parts by fusion of metal.

6. The method of attaching together two metallic parts by means of lugs and bolts, which comprises first assembling the lugs and bolts on a templet in the desired relation to each other, and then permanently uniting the lugs to said parts.

7. The method of attaching together two metallic parts by means of lugs and bolts, which comprises first assembling the lugs and bolts together, and then permanently uniting the lugs to said parts with the joints between the lugs out of alignment with the joint between the two parts.

8. The method of attaching together two metallic parts by means of lugs and bolts, which comprises first assembling the lugs and bolts together, and then permanently uniting the lugs to said parts with the joints between the lugs staggered relatively to the joint between the two parts.

9. The combination with two thin-edged parts to be bolted together, of a series of pairs of bolting lugs attached to said parts by fusion of metal with the joints between pairs out of alignment with the joint between said parts.

In witness whereof, I have hereunto set my hand this 18th day of February, 1925.

FRANK A. HAUGHTON.

Certificate of Correction.

It is hereby certified that in Letters Patent No. 1,597,463, granted August 24, 1926, upon the application of Frank A. Haughton, of Schenectady, New York, for an improvement in Methods of and Means for Fastening Together Metallic Parts," an error appears in the printed specification requiring correction as follows: Page 2, line 126, claim 2, after the word " fastening " insert the word *it;* and that the said Letters Patent should be read with this correction therein that the same may conform to the record of the case in the Patent Office.

Signed and sealed this 5th day of October, A. D. 1926.

[SEAL.]

M. J. MOORE,
*Acting Commissioner of Patents.*

Certificate of Correction.

It is hereby certified that in Letters Patent No. 1,597,463, granted August 24, 1926, upon the application of Frank A. Haughton, of Schenectady, New York, for an improvement in Methods of and Means for Fastening Together Metallic Parts," an error appears in the printed specification requiring correction as follows: Page 2, line 126, claim 2, after the word " fastening " insert the word *it;* and that the said Letters Patent should be read with this correction therein that the same may conform to the record of the case in the Patent Office.

Signed and sealed this 5th day of October, A. D. 1926.

[SEAL.]
M. J. MOORE,
*Acting Commissioner of Patents.*